United States Patent [19]

Matsuno et al.

[11] Patent Number: 6,072,008

[45] Date of Patent: Jun. 6, 2000

[54] RESIN COMPOSITION FOR USE IN COATING COMPOSITION

[75] Inventors: Yoshizumi Matsuno; Nobushige Numa, both of Kanagawa-ken, Japan

[73] Assignee: Kansai Paint Co., Ltd., Hyogo-Ken, Japan

[21] Appl. No.: 09/209,246

[22] Filed: Dec. 10, 1998

[30] Foreign Application Priority Data

Dec. 12, 1997 [JP] Japan .................................. 9-342820

[51] Int. Cl.$^7$ .................................................. C08F 230/08
[52] U.S. Cl. .......................... 525/330.3; 528/39; 528/38; 528/42; 528/30; 528/32; 427/387
[58] Field of Search ......................... 427/387; 525/330.3; 528/39, 38, 42, 30, 32

[56] References Cited

U.S. PATENT DOCUMENTS 6,015,848  1/2000  Ikushima et al. ........................ 523/427

FOREIGN PATENT DOCUMENTS

| 94/306328 | 11/1994 | Japan . |
| 97/40907 | 2/1997 | Japan . |
| 97/40908 | 2/1997 | Japan . |
| 97/40911 | 2/1997 | Japan . |

*Primary Examiner*—Robert Dawson
*Assistant Examiner*—Kuo-Liang Peng
*Attorney, Agent, or Firm*—Fisher, Christen & Sabol

[57] ABSTRACT

A resin composition for use in a coating composition comprising (A) a base resin having a hydroxyl value of 20 to 200, (B) a silicone compound consisting of a partial hydrolysis.condensation product of (i) an organofunctional group-containing alkoxysilane compound containing at least one organofunctional group selected from the group consisting of mercapto group, epoxy group, (meth)acryloyl group, vinyl group, haloalkyl group and amino group, (ii) a tetraalkoxysilane compound and preferably (iii) a trialkoxysilane compound, and (C) a reaction product prepared by partly reacting the hydroxyl group in the base resin (A) with alkoxysilyl group in the silicone compound (B).

10 Claims, No Drawings

RESIN COMPOSITION FOR USE IN COATING COMPOSITION

BACKGROUND OF THE INVENTION (1) Field of the Invention

The present invention relates to a resin composition for use in a coating composition, particularly useful for the application to the topcoating.

(2) Description of the Background Art

Outdoor applications, for example, topcoating films applied onto the bodies of automobiles, rail road cars, etc. had such disadvantages that the coating films showed poor appearance with time due to dust, sand dust, iron powder, acid rain, etc. in the air, particularly so for a coating film showing poor resistance to acid rain. For the purpose of solving the above disadvantages, attempts have been made on selection of a crosslinked resin and on improvements in physical properties of the coating film. However the above attempts all produced such problems that adhesion of pollutants onto the surface of the coating film makes it difficult to remove the resulting stain, resulting in showing poor film appearance.

As a method of preventing adhesion of pollutants onto the coating film, for example, a method of adding to a coating composition or coating onto the surface of the coating film an antistatic agent, which reduces a surface resistivity of the coating film so as to prevent a static adhesion of dust, etc. However, according to the above methods, poor water resistance of the conventional antistatic agent made difficult the maintenance of their effects in outdoor applications.

Japanese Patent Application Laid-Open No. 306328/94 discloses an acid rain-resistant coating composition prepared by adding a condensation product between an alkyl-silicate oligomer and a silane coupling agent consisting of a hydrolyzate of an epoxy-functional silane to a coating composition, resulting in showing poor film performances.

For the purpose of preventing adhesion of pollutants by developing hydrophilic properties on the surface of a coating film while maintaining good film performances, a coating composition containing, as a hydrophilic properties-imparting component, a silicone compound having a specified organofunctional group and alkoxysilyl group is disclosed, for example, in Japanese Patent Application Laid-Open Nos. 40907/97, 40908/97, 40911/97, etc. The above coating composition makes it possible to form a coating film having hydrophilic properties on its surface and showing good properties in pollution resistance, acid resistance, etc. However, unsatisfactory compatibility of the base resin in the coating composition with the above silicone compound may cause the silicone compound to locally agglomerate, particularly the application to a cold-drying clear coating composition may form a clear coating film showing cloudiness, resulting in making difficult coexistence of finish properties with pollution resistance. Moreover, development of hydrophilic properties on the surface of the coating film during outdoor exposure required 3 months or longer, the development of hydrophilic properties from the beginning being demanded.

SUMMARY OF THE INVENTION

It is an object of the present invention to provide a resin composition capable of improve compatibility of the base resin with the silicone compound, and capable of forming a coating film having good compatibility on the film surface and showing improved dispersion of the silicone compound as the hydrophilic properties-imparting component on the film surface, resulting in making possible coexistence of finish properties with pollution resistance.

It is another object of the present invention to provide a resin composition applicable to a heat-curing coating composition and a cold-drying coating composition, particularly to a cold-drying clear coating composition.

That is, the present invention provides a resin composition for use in a coating composition comprising (A) a base resin having a hydroxyl value of 20 to 200, (B) a silicone compound consisting of a partial hydrolysis.condensation product of (i) an organofunctional group-containing alkoxysilane compound containing at least one organofunctional group selected from the group consisting of mercapto group, epoxy group, (meth)acryloyl group, vinyl group, haloalkyl group and amino group, and (ii) a tetraalkoxysilane compound, and (C) a reaction product prepared by partly reacting the hydroxyl group in the base resin (A) with alkoxysilyl group in the silicone compound (B).

DETAILED DESCRIPTION OF THE INVENTION

The base resin (A) in the present invention has a hydroxyl value of 20 to 200, preferably 30 to 180, and may include, for example, acrylic resin, fluorocarbon resin, polyester resin, alkyd resin, and the like.

The above acrylic resin is an acrylic copolymer having a weight average molecular weight of 1,000 to 100,000, preferably 5,000 to 75,000, and is usually prepared by copolymerizing a monomer mixture comprising hydroxtyl group-containing monomer and other monomer copolymerizable therewith according to the conventional polymerization method such as solution polymerization in the presence of a radical polymerization initiator.

Examples of the hydroxyl group-containing monomer may include 2-hydroxyethyl (meth)acrylate, 2-hydroxypropyl (meth)acrylate, 2-hydroxyethyl vinyl ether, 2-hydroxypropyl vinyl ether, 2-hydroxyethyl allyl ether, and the like.

The copolymerizable other monomer may include, for example, vinyl aromatic compounds such as styrene, α-methylstyrene, vinyl toluene, α-chlorostyrene and the like; $C_{1-24}$ alkyl esters or cycloalkyl esters of acrylic acid or methacrylic acid, for example, methyl (meth)acrylate, ethyl (meth)acrylate, n-propyl (meth)acrylate, i-propyl (meth) acrylate, n-, i-, t-butyl (meth)acrylate, hexyl (meth) acrylate, cyclohexyl (meth)acrylate, 2-ethylhexyl (meth) acrylate, n-octyl (meth)acrylate, decyl (meth)acrylate, lauryl (meth) acrylate, stearyl (meth)acrylate, isobornyl (meth)acrylate, and the like; vinyl acetate, vinyl chloride, vinyl ether, (meth)acrylonitrile and the like, and may also include so-called macromonomers, which are a polymer of at least one of the above monomers and have a polymerizable unsaturated group at one terminal end.

Examples of the solvent used in the solution polymerization of the above monomers may include alkylbenzene derivatives such as benzene, toluene, xylene and the like; acetate based solvents such as ethyl acetate, propyl acetate, butyl acetate, amyl acetate, methoxybutyl acetate, methyl acetoacetate, ethyl acetoacetate, methyl cellosolve acetate, cellosolve acetate, diethylene glycol acetate monomethyl ether, carbitol acetate and the like; ether based solvents such as dioxane, ethylene glycol diethyl ether, ethylene glycol dibutyl ether, diethylene glycol diethyl ether and the like; alcohol based solvents such as methanol, ethanol, propanol, i-propanol, n-, i-, t-butanol and the like; and ketone based solvents such as acetone, methyl ethyl ketone, methyl isobutyl ketone, cyclohexanone and the like. These may be used singly or in combination.

Examples of the radical polymerization initiator may include peroxide such as benzoyl peroxide, di-t-butyl hydroperoxide, t-butyl hydroperoxide, cumyl peroxide, cumene hydroperoxide, diisopropyl benzene hydroperoxide, t-butyl peroxybenzoate, lauryl peroxide, acetyl peroxide, t-butyl peroxy-2-ethylhexanoate and the like; azo compounds such as α, α'-azobisisobutylonitrile, α, α'-azobis-2-methylbutylonitrile, azobisdimethylvaleronitrile, azobiscyclohexane carbonitrile and the like.

The above monomer mixture contains 5 to 45% by weight of the hydroxyl group-containing monomer and 55 to 95% by weight of the other copolymerizable monomer.

The above fluorocarbon resin is preferably a fluorine-containing copolymer having a weight average molecular weight of 1,000 to 100,000, preferably 5,000 to 75,000, and a fluorine atom content of 1 to 60% by weight, preferably 10 to 30% by weight. The hydroxyl group-containing fluorine based resin may include, for example, fluorine-containing copolymer prepared by copolymerizing a monomer mixture containing, as major components, fluoroolefin and hydroxyalkyl vinyl ether and optionally other monomers such as alkyl vinyl ether and the like. The fluorine-containing copolymer may be prepared according to the known process such as solution polymerization process. The solution polymerization process may be conducted in the same manner as explained in the preparation of the above acrylic copolymer.

The fluoroolefin used in the above fluorine-containing copolymer may include any ones without particular limitations, preferably perfluoroolefin, particularly chlorotrifluoroolefin, tetrafluoroolefin and mixtures thereof. The hydroxyalkyl vinyl ether used may include preferably ones having $C_{2-5}$ straight or branched alkyl group. Other monomers such as alkyl vinyl ether and the like may include alkyl vinyl ethers having cyclohexyl group or $C_{1-8}$ straight or branched alkyl group, fatty acid vinyl ester, fatty acid isopropenyl ester and the like. The above monomer mixture may preferably contain 10 to 40% by weight of fluoroolefin, 5 to 20% by weight of hydroxyalkyl vinyl ether and 85 to 40% by weight of other monomer.

Specific examples of fluorine-containing copolymer may include Lumiflon series (Trade name marketed by Asahi Glass Co., Ltd.), for example, Lumiflon LF100, Lumiflon LF200, Luniflon LF300, Lumiflon LF400, Lumiflon LF9012, and the like.

The above mentioned polyester resin may include preferably ones having a weight average molecular weight in the range of 1,000 to 100,000, and may easily be prepared by condensation reaction between polyhydric alcohol such as ethylene glycol, butylene glycol, 1,6-hexanediol, neopentyl glycol, trimethylolpropane, pentaerythritol or the like, and polyvalent carboxylic acid such as adipic acid, succinic acid, fumaric acid, terephthalic acid, isophthalic acid, phthalic anhydride, hexahydrophthalic anhydride or the like.

The reaction between the polyhydric alcohol and the polyvalent carboxylic acid may be carried out according to the known process under such a condition as to be an excess amount of hydroxyl group to carboxyl group.

The silicone compound (B) used in the present invention may include a partial hydrolysis.condensation product of (i) an organofunctional group-containing alkoxysilane compound containing at least one organofunctional group selected from the group consisting of mercapto group, epoxy group, (meth)acryloyl group, vinyl group, haloalkyl group and amino group, and (ii) a tetraalkoxysilane compound.

The organofunctional group-containing alkoxysilane compound (i) may include ones having the organofunctional group directly bonded to silicon atom and ones having the organofuncitonal group bonded to silicon atom through bivalent hydrocarbon group having 1 to 10 carbon atoms, and may include conventionally used ones. Specific examples thereof may include mercapto group-containing alkoxysilane compounds such as γ-mercaptopropyltrimethoxysilane, γ-mercaptopropyltriethoxysilane, γ-mercaptopropyltributoxysilane, γ-mercaptopropylmethyldimethoxysilane, γ-mercaptopropylmethyldiethoxysilane, β-mercaptomethylphenylethyltrimethoxysilane, mercaptomethyltrimethoxysilane, 6-mercaptohexyltrimethoxysilane, 10-mercaptodecyltrimethoxysilane, and the like; epoxy group-containing alkoxysilane compounds such as γ-glycidoxypropyltrimethoxysilane, γ-glycidoxypropyltriethoxysilane, γ-glycidoxypropyltributoxysilane, γ-glycidoxypropyltriisopropenoxysilane, γ-glycidoxypropylmethyldimethoxysilane, γ-glycidoxypropylmethyldiethoxysilane, β-(3,4-epoxycyclohexyl)ethyltrimethoxysilane, β-(3,4-epoxycyclohexyl)ethyltriethoxysilane, β-(3,4-epoxycyclohexyl)ethylmethyldimethoxysilane, β-(3,4-epoxycyclohexyl)ethylmethyldiethoxysilane, 5,6-epoxyhexyltrimethoxysilane, 9,10-epoxydecyltrimethoxysilane, and the like; (meth)acryloyl group-containing alkoxysilane compounds such as γ-(meth)acryloxypropyltrimethoxysilane, γ-(meth)acryloxypropyltriethoxysilane, γ-(meth)acryloxypropyltributoxysilane, γ-(meth)acryloxypropylmethyldimethoxysilane, γ-(meth)acryloxypropylmethyldiethoxysilane, γ-(meth)acryloxymethyltrimethoxysilane, and the like; vinyl group-containing alkoxysilane compounds such as vinyltrimethoxysilane, vinyltriethoxysilane, vinyltributoxysilane, vinylmethyldimethoxysilane, 5-hexenyltrimethoxysilane, 9-decenyltrimethoxysilane, and the like; haloalkyl group-containing alkoxysilane compounds such as γ-chloropropyltrimethoxysilane, γ-bromopropyltrimethoxysilane, trifluoropropyltrimethoxysilane, nonafluorohexyltrimethoxysilane, and the like; amino group-containing alkoxysilane compounds such as γ-aminopropyltrimethoxysilane, γ-aminopropyltriethoxysilane, γ-aminopropyltributoxysilane, γ-aminopropylmethyldimethoxysilane, γ-aminopropylmethyldiethoxysilane, N-(β-aminoethyl)-γ-aminopropyltrimethoxysilane, N-(β-aminoethyl)-γ-aminopropyltriethoxysilane, N-(β-aminoethyl)-γ-aminopropyltributoxysilane, N-(β-aminoethyl)-γ-aminopropylmethyldimethoxysilane, N-phenyl-γ-aminopropyltrimethoxysilane, and the like; and the like.

These organofunctional group-containing alkoxysilane compunhds may be used alone or in combination.

Of these, from the standpoints of good film performances in pollution resistance, durability and the like, mercapto group-containing alkoxysilane compounds and epoxy group-containing alkoxysilane compounds are preferred.

Examples of the tetraalkoxysilane compound (ii) may include tetramethoxysilane, tetraethoxysilane, tetraisopropoxysilane, and tetrabutoxysilane. These compounds may be used alone or in combination.

Of these, use of tetramethoxysilane and tetraethoxysilane is particularly preferred from such standpoints that the alkoxysilane group is easily hydrolyzed to form silanol group, resulting in forming a coating film having good pollution resistance.

The above compounds (i) and (ii) are mixed at a molar ratio in the range of 8:1 to 1:19, preferably 2:1 to 1:9, followed by being subjected to partial hydrolysis.condensation reaction to obtain the silicone compound (B). A less amount of the compound (ii) results a silicone compound (B) showing poor hydrophilic properties, resulting in poor pollution resistance and acid resistance. On the other hand, a more amount of the compound (ii) causes poor compatibility with the base resin (A) and reduces stability of the silicone compound (B) on reacting with the base resin (A) so as to make it difficult to obtain the reaction product (C), resulting in reducing finish properties of a coating film.

The silicone compound (B) may also include a partial hydrohysis.condensation product of a mixture of the above compounds (i) and (ii) with (iii) a trialkoxysilane compound. The use of the trialkoxysilane compound (iii) makes it possible to impart pliability and flexibility to the coating film without considerably reducing hydrophilic properties of the coating film.

Examples of the trialkoxysilane compound (iii) may include methyltrimethoxysilane, methyltriethoxysilane, methyltributoxysilane and the like. These may be used singly or in combination.

The partial hydrolysis.condensation product by use of the compounds (i), (ii) and (iii) may be prepared by a process which comprises subjecting a mixture of the compounds (i), (ii) and (iii) to partial hydrolysis.condensation reaction, reacting the compound (i) with a partial hydrolysis.condensation product of the compounds (ii) and (iii), reacting the compound (ii) with a partial hydrolysis.condensation product of the compounds (i) and (iii), or the like. Of these, the process of subjecting the mixture of the compounds (i), (ii) and (iii) to partial hydrolysis.condensation reaction is particularly preferred.

In the case where the trialkoxysilane compound (iii) is used for the preparation of the silicone compound (B), a mixing ratio of the three compounds (i), (ii) and (iii) is such that the compound (i) is in the range of 5 to 80 mol %, preferably 10 to 50 mol %, the compound (ii) is in the range of 10 to 94.9 mol %, preferably 25 to 90 mol %, and the compound (iii) is in the range of 0.1 to 30 mol %, preferably 1 to 25 mol %, and that a mixed amount of the compounds (ii) and (iii) is in the range of 20 to 95 mol %, preferably 50 to 90 mol %. Three compounds (i), (ii) and (iii) are mixed at the above mixing ratio to be subjected to partial hydrolysis.condenstion reaction for obtaining the silicone compound (B). A mixing amount of the compound (i) less than 5 mol % results poor compatibility with the base resin (A). A mixing amount more than 80 mol % reduces hydrophilic properties. A mixing amount less than 10 mol % of the compound (ii) reduces hydrophilic properties, resulting in poor pollution resistance and acid resistance. A mixing amount more than 94.9 mol % results poor compatibility with the base resin (A) and reduces stability of the resin (B) on reacting with the base resin (A) so as to make it difficult to obtain the reaction product (C), resulting in reducing finish properties of the coating film. A mixing amount less than 0.1 mol % of the compound (iii) may develop cracks without imparting flexibility to the coating film. A mixing amount more than 30 mol % causes to lack hydrophilic properties due to too high hydrophobic properties, resulting in unsatisfactory pollution resistance.

The silicone compound (B) preferably has an average degree of polymerization in the range of 3 to 100, preferably 5 to 80. An average degree of polymerization less than 3 causes volatilization and makes it impossible to impart satisfactory hydrophilic properties to the surface of the coating film. An average degree of polymerization more than 100 makes it difficult to obtain the reaction product (C) to be prepared by reacting with the base resin (A), resulting in reducing finish properties of the coating film.

The silicone compound (B) may be prepared according to a known process, for example, by a process which comprises adding water to a mixture of the compounds (i) and (ii) or of the compounds (i), (ii) and (iii), followed by subjecting to a partial cohydrolysis.condensation reaction at a temperature in the range of room temperature to 150° C. in the presence of a hydrolysis.condensation catalyst. In the above partial cohydrolysis.condensation, a degree of cohydrolysis is so intimately correlated with a degree of corresponding polymerization that, for example, zero degree of hydrolysis corresponds to zero degree of polymerization, and 100% of the degree of hydrolysis results that the degree of polymerization is so increased that gelling takes place, and is controlled so that an average degree of polymerization of the silicone compound can be in the above range.

The hydrolysis.condensation catalyst used in the above partial hydrolysis.condensation reaction may include conventionally used ones, and specifically include, for example, organic acids such as acetic acid, butyric acid, maleic acid, citric acid and the like; inorganic acids such as chloric acid, nitric acid, phosphoric acid, sulfuric acid and the like; basic compounds such as triethylamine; organometallic salts such as tetrabutyl titanate, dibutyltin dilaurate and the like; fluorine-containing compounds such as potassium fluoride (KF), ammonium fluoride ($NH_4F$) and the like; and the like. The above catalyst may be used alone or in combination. Of these, the fluorine-containing compound has a good function to promote condensation of highly reactive silanol groups so as to be suitable for use in synthesizing a product containing silanol group in a small amount, and is particularly preferred in that a resulting coating composition shows good storage stability. An amount of the catalyst used is preferably in the range of 0.0001 to 1 mol %.

On carrying out the partial cohydrolysis.condensation reaction in the present invention, if needed, an organic solvent may be used. Examples of the solvent used may include alcohols such as methanol, ethanol, isopropanol, t-butanol and the like; ketones such as acetone, methyl isobutyl ketone and the like; ethers such as dibutyl ether; esters such as ethyl acetate; aromatic hydrocarbons such as toluene; and the like. Of these organic solvents such as methanol, ethanol, acetone and the like are preferred.

An amount of water used in the partial cohydrolysis.condensation reaction of the present invention may be determined depending on an intended degree of polymerization. A strict determination of the above amount is necessary because addition of an excess water causes alkoxy group to be broken, and finally causes gelation. The use of the fluorine-containing compound as the catalyst is preferable in that the fluorine-containing compound has an ability to completely proceed the hydrolysis.condensation, resulting in making it possible to determine a degree of polymerization depending on an amount of water added, and to arbitrarily predetermine a molecular weight. That is, in the case of the preparation of an intended silicone compound having an average degree of polymerization of M, use of (M−1) mols of water relative to M mols of alkoxysilane compound is sufficient.

Use of other catalysts needs use of water in an amount a little more than the above.

A mixing amount of the above silicone compound (B) is preferably in the range of 0.1 to 50 parts by weight, preferably 1 to 20 parts by weight per 100 parts by weight (as solid content) of the base resin (A). A mixing amount less than 0.1 part by weight makes it impossible to obtain a coating film having a satisfactory pollution resistance. On the other hand, a mixing amount more than 50 parts by weight results a coating film having poor properties in water resistance, acid resistance, alkali resistance, etc.

The reaction product (C) in the present invention is prepared by partly reacting hydroxyl group in the base resin (A) with alkoxysilyl group in the silicone compound (B). The preparation of the reaction product (C) may be carried out so that a mixture of the base resin (A) with the silicone compound (B) may be heated so as to take place a dealcoholation reaction, which takes place by heating at a temperature in the range of 50 to 150° C. A temperature lower than 50° C. causes too slow proceeding of the reaction to be impractical. A temperature higher than 150° C. reduces stability of the silicone compound (B), resulting in making it difficult to control the reaction. At least one selected from the above hydrolysis.condensation catalysts used in the preparation of the silicone compound (B), if needed, may be used in the dealcoholation reaction.

In the present invention, the above reaction product (C) may be added to the base resin (A) and the silicone compound (B) to prepare the resin composition. Preferably, the resin composition of the present invention may be prepared so that a mixture containing 0.1 to 50 parts by weight of the silicone compound (B) per 100 parts by weight of the base resin (A) may be heated and partly reacted at a temperature in the range of 50 to 150° C. so as to partly contain the reaction product (C) in the resin composition. The above reaction may preferably be carried out to such an extent that 1 to 50% by weight, preferably 1 to 30% by weight of a solid content of the silicone compound (B) to be added may be used for the preparation of the reaction product (C). A used amount less than 1 (one) % by weight makes it possible neither to obtain an effect of improving compatibility, nor to obtain pollution resistance of a coating film from the beginning. A used amount more than 50% by weight results a resin composition having high molecular weight and a coating film having poor properties in pollution resistance, finish properties, water resistance, etc.

The resin composition of the present invention contains the above components (A), (B) and (C), and may be used as a base resin component in a coating composition as well as a resin component to be added.

A coating composition containing the resin composition of the present invention as a vehicle component may optionally contain a crosslinking agent such as melamine resin, polyisocyanate compound or the like.

The melamine resin may preferably include methylol melamine resin and $C_{1-5}$ alkyl etherified melamine resin.

Examples of the polyisocyanate compound may include aromatic, alicyclic or aliphatic polyisocyanate compounds such as tolylene diisocyanate, xylylene diisocyanate, phenylene diisocyanate, diphenylmethane diisocyanate, bis (isocyanate methyl) cyclohexane, tetramethylene diisocyanate, hexamethylene diisocyanate, trimethylhexamethylene diisocyanate, methylene diisocyanate, isophorone diisocyanate and the like; isocyanurates or biurets thereof, terminal isocyanate-containing compounds prepared by reacting an excess of the above isocyanate compound with a low molecular weight active hydrogen-containing compound such as ethylene glycol, propylene glycol, trimethylolpropane, hexanetriol, castor oil or the like; lysine triisocyanate and the like.

The above coating composition may optionally include pigments, curing catalysts, ultraviolet light absorbers, antioxidant agents, coating surface controllers, polymer fine particles and the like.

The above coating composition may not only be used as a top clear coating composition, but also be used as a colored top coating composition.

The coating composition of the present invention is capable of forming a coating film by coating the above coating composition onto a substrate, followed by drying at room temperature or by heating. Examples of the substrate may include inorganic substrates such as slate, concrete and the like; metallic substrates such as steel, aluminum, zinc, stainless steel, ones obtained by subjecting the above metals to a surface treatment with chromic acid, zinc phosphate and the like; plastic substrates such as polyvinylchloride, polyethyleneterephthalate, polyethylene and the like; and the like. If needed, the substrate used may also include ones obtained by coating a known primer, intercoating, topcoating and the like onto the above substrate.

A coating method of the above coating composition may include any known methods, for example, brushing, spray coating, roller coating, dip coating and the like. A coating amount as a film thickness is desirably in the range of 1 to 100 μm, preferably 10 to 60 μm.

The coating film formed from the coating composition of the present invention shows a reducing contact angle to water by an action of rain or the like during outdoor exposure within one month. That is, a finally reduced contact angle to water of the coating film subjected to outdoor exposure can be forecast by subjecting a surface of a coating film prior to outdoor exposure to an acid treatment under such conditions that the coating film is dipped into 2.5 wt % sulfuric acid water at 20° C. for 24 hours followed by washing the sulfuric acid water adhered thereonto with water, drying and by measuring a contact angle to water of the surface of the resulting coating film.

The present invention can provide a resin composition capable of improve compatibility of the base resin with the silicone compound, and capable of forming a coating film having good compatibility on the film surface and showing improved dispersion of the silicone compound as the hydrophilic properties-imparting component on the film surface, resulting in making possible coexistence of finish properties with pollution resistance.

The present invention also can provide a resin composition applicable to a heat-curing coating composition and a cold-drying coating composition, particularly to a cold-drying clear coating composition.

The present invention will be explained more in detail by the following Examples and Comparative Examples, in which "part" and "%" represent "part by weight" and "% by weight" respectively.

EXAMPLE

Preparation of Hydroxyl Group-containing Acrylic Resin

Preparation Example 1

A reactor equipped with a stirrer, thermometer, thermostat, reflux condenser and dropping pump was changed with 40 parts of butyl acetate and 27 parts of xylene, followed by heating up to 125° C. with agitation under nitrogen atmosphere, dropping a mixture of 20 parts of methyl methacrylate, 30 parts of i-butyl methacrylate, 6.55 parts of t-butyl methacrylate, 20 parts of n-butyl acrylate, 0.25 part of acrylic acid, 23.2 parts of 2-hydroxyethyl methacrylate and 7 parts of 2,2'-azobisisobutyronitrile at that temperature over 3 hours at a constant speed, keeping at that temperature for 30 minutes after the completion of dropping with agitation, dropping a solution prepared by dissolving 0.5 part of azobisdimethylvaleronitrile as an additional catalyst into 13 parts of butyl acetate over one hour at a constant speed, and by aging for one hour at that temperature after the completion of dropping to obtain a transparent acrylic copolymer solution (A-1) having a non-volatile matter content of 55.2%.

Preparation Example 2

A reactor equipped with a stirrer, thermometer, thermostat, reflux condenser and dropping pump was charged with 40 parts of butyl acetate and 27 parts of xylene, followed by heating up to 125° C. with agitation under nitrogen atmosphere, dropping a mixture of 19 parts of styrene, 34 parts of cyclohexyl methacrylate, 6 parts of 2-ethylhexyl acrylate, one part of acrylic acid, 40 parts of 2-hydroxyethyl methacrylate and 2 parts of 2,2'-azobisisobutyronitrile at that temperature over 3 hours at a constant speed, keeping at that temperature for 30 minutes after the completion of dropping with agitation, dropping a solution prepared by dissolving 0.5 part of azobisdimethylvaleronitrile as an additional catalyst into 35 parts of butyl acetate over one hour at a constant speed, and by aging for one and half hours at that temperature after the completion of dropping to obtain a transparent acrylic copolymer solution (A-2) having a non-volatile matter content of 50.2%.

Preparation Examples 3–5

Procedures of Preparation Example 2 were duplicated except that mixtures of monomers with polymerization initiator were used as listed in Table 1 to obtain acrylic polymer solutions (A-3) to (A-5). Properties of the polymer solutions and copolymers are shown in Table 1.

TABLE 1

| | Preparation Examples | | | | |
|---|---|---|---|---|---|
| | 1 | 2 | 3 | 4 | 5 |
| Acrylic copolymer solution | A-1 | A-2 | A-3 | A-4 | A-5 |
| Starting materials | | | | | |
| Styrene | | 19 | 10 | 19 | 19 |
| Methyl methacrylate | 20 | | 10 | 10 | 10 |
| n-butyl methacrylate | | | 49 | 50 | |
| i-butyl methacrylate | 30 | | | | |
| t-butyl methacrylate | 6.55 | | | | |
| n-butyl acrylate | 20 | | 16 | 16 | |
| cyclohexyl methacrylate | | 34 | | | |
| 2-ethylhexyl acrylate | | 6 | | | 20 |
| acrylic acid | 0.25 | 1 | 1 | 1 | 1 |
| 2-hydroxyethyl meth-acrylate | 23.2 | 40 | 14 | 4 | 50 |
| 2,2'-azobisisobutyronitrile | 7 | 2 | 0.2 | 0.7 | 4.5 |
| Total | 107 | 102 | 100.2 | 100.7 | 104.5 |
| Non-volatile matter content (%) | 55.2 | 50.2 | 50 | 50.3 | 50.5 |
| Viscosity (Gardner: 25° C.) | DE | V | Z1 | TU | Q |

TABLE 1-continued

| | Preparation Examples | | | | |
|---|---|---|---|---|---|
| | 1 | 2 | 3 | 4 | 5 |
| Hydroxyl value | 100 | 173 | 60 | 17 | 216 |
| Weight average molecular weight | 5000 | 20000 | 75000 | 45000 | 10000 |
| Glass transition temperature (° C.) | 35 | 53 | 22 | 25 | 36 |

Preparation of Organofunctional Group and Alkoxy Group-containing Silicone Compound Preparation Example 6

A 1000 ml reactor equipped with a thermometer, nitrogen gas inlet and dropping funnel was charged with 47.3 g (0.20 mol) of γ-glycidoxypropyltrimethoxysilane, 114.0 g (0.75 mol) of tetramethoxysilane, 6.8 g (0.05 mol) of methyltrimethoxysilane, 160 g (5 mol) of methanol and 0.06 g (0.001 mol) of KF, followed by slowly dropping 17.1 g (0.95 mol) of water with agitation at room temperature, stirring at room temperature for 3 hours after the completion of dropping, heating for 2 hours with agitation under methanol reflux, and subjecting low-boiling components to vacuum distillation.filtration to obtain 113 g of a colorless transparent liquid (Compound B-1). The compound B-1 was subjected to a GPC measurement to show an average degree of polymerization of 20.5 (a predetermined degree of polymerization of 20) so as to be nearly equal to the predetermined value. Measurement according to an epoxy ring opening method with hydrochloric acid resulted an epoxy equivalent of 625 g/mol (predetermined value: 622 g/mol) and showed that a predetermined amount of epoxy group was introduced. Measurement of alkoxy group according to an alkali cracking method resulted to be 45.5% (theoretical value: 46.1%). Measurement according to $^1$H-NMR resulted that a reaction product had such a structure as to be represented by the following average composition formula:

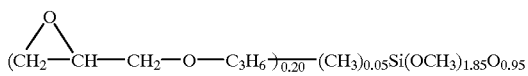

Preparation Examples 7–9

Preparation Example 6 was duplicated except that organofunctional group-containing alkoxysilane compounds, alkyltrialkoxysilane compounds, tetraalkoxysilane compounds and catalysts were used as shown in Table 2 to obtain compounds (B-2) to (B-4) respectively. In Table 2, amounts of respective compounds are represented by mole unit.

TABLE 2

| | Preparation Examples | | | |
|---|---|---|---|---|
| | 6 | 7 | 8 | 9 |
| silicone compound | B-1 | B-2 | B-3 | B-4 |
| γ-glycidoxypropyltrimethoxysilane | 0.20 | | | 0.20 |
| γ-mercaptopropyltrimethoxysilane | | 0.38 | | |
| vinyltriethoxysilane | | | 0.05 | |
| methyltrimethoxysilane | 0.05 | 0.02 | | |
| methyltriethoxysilane | | | 0.30 | |

TABLE 2-continued

|  | Preparation Examples | | | |
|---|---|---|---|---|
|  | 6 | 7 | 8 | 9 |
| tetramethoxysilane | 0.75 |  |  | 0.80 |
| tetraethoxysilane |  | 0.60 | 0.65 |  |
| KF |  | 0.001 | 0.001 | 0.01 |
| HCl |  | 0.005 |  | 0.005 |
| H$_2$O | 0.95 | 0.80 | 0.975 | 0.95 |
| Degree of polymerization | 20 | 5 | 40 | 20 |

Preparation of Resin Composition

Example 1

A reactor equipped with a thermometer, thermostat, stirrer and reflux condenser was charged with 182 parts of acrylic copolymer solution (A-1), followed by adding 20 parts of silicone compound (B-1) with agitation, heating up to 100° C. over about 30 minutes, and keeping at that temperature for 8 hours so as to partly contain a reaction product. The resulting resin solution was transparent. In the resin solution, 20.5% by weight of the added silicone compound (B-1) was consumed for the preparation of the reaction product.

A degree of consumption (%) of the above silicone compound was determined as follows. The above resin solution was mixed with polyisocyanate at such a mixing ratio of an amount of hydroxyl group in the resin solution to an amount of isocyanate group in the polyisocyanate as to be equal to each other in equivalence, followed by coating onto a tinplate, curing in a desiccator for 7 days under the conditions of a humidity of 25% or less and room temperature to form a cured film, and by subjecting the cured film to an acetone extraction under reflux for 6 hours to determine a residual percentage G1 (%) of the cured film. Next, a mixed solution of an acrylic copolymer solution with a silicone compound prior to preparing the above reaction product was mixed with polyisocyanate at such a mixing ratio as to be equal to each other in equivalence in the same manner as above, followed by coating onto a tinplate, curing in a desiccator for 7 days under the conditions of a humidity of 25% or less and room temperature to form a cured film, and by subjecting to an acetone extraction under reflux for 6 hours to determine a residual percentage G2 (%) of the cured film.

The degree of consumption was determined from a difference of residual percentages of cured films between before and after the preparation of the above reaction products according to the following formula:

Degree of consumption (%)={(G1−G2)/(amount by weight of the silicone compound added per 100 parts by weight of the solid content in the resin (A))}×100

The resin solution obtained as above was left to stand for 3 months in a closed state at room temperature showing little or no changes in viscosity.

Examples 2–8 and Comparative Examples 1–6

Example 1 was duplicated except for formulations and reaction conditions as shown in Table 3 to prepare resin solutions respectively. Properties of respective resin solutions are also shown in Table 3.

(Note 1) Fluorocarbon Resin Solution:

"Lumiflon LF-200" (Trade name, marketed by Asahi Glass Co., Ltd., solid content: 60%, hydroxyl value: 34, weight average molecular weight: 60,000)

TABLE 3

|  | Examples | | | | | | | | Comparative Examples | | | | | |
|---|---|---|---|---|---|---|---|---|---|---|---|---|---|---|
|  | 1 | 2 | 3 | 4 | 5 | 6 | 7 | 8 | 1 | 2 | 3 | 4 | 5 | 6 |
| Acrylic copolymer solutions | | | | | | | | | | | | | | |
| A-1 | 182 | | | | | | | | | | | | | |
| A-2 |  | 200 |  | 200 | 200 | 200 |  | 200 |  |  | 200 | 200 | 200 | 200 |
| A-3 |  |  | 200 |  |  |  |  |  |  |  |  |  |  |  |
| A-4 |  |  |  |  |  |  |  |  | 200 |  |  |  |  |  |
| A-5 |  |  |  |  |  |  |  |  |  | 200 |  |  |  |  |
| Fluorocarbon resin solution (Note 1) |  |  |  |  |  |  | 167 |  |  |  |  |  |  |  |
| Silicone compounds | | | | | | | | | | | | | | |
| B-1 |  |  |  | 10 |  |  |  |  |  |  | 20 |  |  |  |
| B-2 | 20 | 20 | 20 |  |  |  |  | 20 | 20 | 20 |  | 20 |  |  |
| B-3 |  |  |  |  | 15 |  | 20 |  |  |  |  |  | 20 |  |
| B-4 |  |  |  |  |  | 20 |  |  |  |  |  |  |  | 20 |
| Reaction temperatures (° C.) | 100 | 100 | 80 | 110 | 100 | 100 | 100 | 120 | 110 | 100 | 25 | 25 | 25 | 25 |
| Reaction time | 8 | 8 | 10 | 6 | 10 | 9 | 8 | 12 | 8 | 6 | 10 | 50 | 100 | 50 |
| Appearance of resin solution | transparent | transparent | transparent | transparent | transparent | transparent | transparent | transparent | transparent | transparent | cloudy | cloudy | cloudy | cloudy |
| Degree of consumption (%) | 20.5 | 25.6 | 10.3 | 22.3 | 20.5 | 17.9 | 18.3 | 54 | 15.9 | 30.7 | 0 | 0 | 0 | 0 |

TABLE 3-continued

|  | Examples | | | | | | | | Comparative Examples | | | | | |
| --- | --- | --- | --- | --- | --- | --- | --- | --- | --- | --- | --- | --- | --- | --- |
|  | 1 | 2 | 3 | 4 | 5 | 6 | 7 | 8 | 1 | 2 | 3 | 4 | 5 | 6 |
| Storage at room temperature for 3 months | good | good | good | good | good | good | good | slightly thickened | good | gelling | good | good | good | good |

Coating Film Performance Test

Preparation of Test Coating Compositions

Respective resin solutions obtained in Examples and Comparative Examples were mixed with a polyisocyanate compound "Coronate EH" (Trade name, marketed by Nippon Polyurethane Industries Co., Ltd.) at a mixing ratio so that an equivalent ratio of hydroxyl group to isocyanate group may be one to one, followed by controlling viscosity with a thinner consisting of xylene: butyl acetate=50:50 at 13 to 14 sec (Ford cup, #4, 25° C.) to prepare test coating compositions respectively.

Preparation of Test Panels

An amino-acrylic resin based clear coating composition was coated onto an electrodeposition-coated mild steel sheet, followed by curing at 140° C. for 20 minutes, treating the coating film surface with a fine polishing compound, spay coating a acrylic-urethane resin based metallic base coating composition to be a dry film thickness of 15 to 20 μm, leaving to stand at room temperature for 10 minutes, spray coating thereonto the above test coating compositions to be a dry film thickness of 40 μm, and by leaving to stand at room temperature for 7 days to prepare test panels respectively. Respective test panels were subjected to the following performance tests. Results are shown in Table 4.

(*1) Smoothness on Coating Film Surface:

Conditions of coating film surface were visually observed and evaluated as follows. 3: good smoothness free of orange peel and unevenness; 2: slightly poor in smoothness; 1: poor in smoothness with development of orange peel and unevenness.

(*2) Gloss on Film Surface:

Measurements of 60° specular reflection percentage were made.

(*3) Acid Resistance:

Onto the surface of a coating film was dropped 0.5ml of 40% aqueous sulfuric acid solution, followed by heating at 70° C. for 20 minutes, and washing with water to evaluate conditions of film surface as follows. 3: Unchanged; 2: slight development of flashing and blisters; 1: remarkable development of flashing and blisters.

(*4) Contact Angle to Water After Acid Treatment:

A test panel was dipped into a 2.5% aqueous sulfuric acid solution at 20° C. for 24 hours followed by washing the aqueous sulfuric acid solution adhered onto the film with water, drying, dropping a 0.03 ml water drop of deionized water onto the surface of the film, and measuring a contact angle of the water drop three minutes after at 20° C. by use of a Contactangle meter DCAA marketed by Kyowa Chemical Co., Ltd.

(*5) Outdoor Exposure Test:

A test panel was installed at an angle of 30 degrees on the south side in Tokyo Factory, Kansai Paint Co., Ltd. Respective test panels at the beginning, one month after and 3 months after outdoor exposure were subjected to the following appearance test and contact angle to water test as follows without subjecting to further treatment, for example, washing with water, etc.

Appearance (pollution):

Evaluation was made as follows. 5: No changes in pollution compared with the test panel at the beginning; 4: very slight changes in pollution compared with the test panel at the beginning; 3: slight changes in pollution compared with the test panel at the beginning; 2: considerable changes in pollution compared with the test panel at the beginning; 1: remarkable changes in pollution compared with the test panel at the beginning.

Contact Angle to Water:

Measurement was made in the same manner as in (*4) without subjecting to pretreatments such as acid treatment, washing with water and the like.

TABLE 4

|  |  | Examples | | | | | | | | Comparative Examples | | | | | |
| --- | --- | --- | --- | --- | --- | --- | --- | --- | --- | --- | --- | --- | --- | --- |
|  |  | 1 | 2 | 3 | 4 | 5 | 6 | 7 | 8 | 1 | 2 | 3 | 4 | 5 | 6 |
| Smoothness on coating film surface (*1) | | 3 | 3 | 3 | 3 | 3 | 3 | 3 | 3 | 3 | 1 | 1 | 1 | 1 | 1 |
| Gloss on film surface (*2) | | 94 | 92 | 90 | 94 | 92 | 90 | 90 | 88 | 87 | 83 | 68 | 70 | 72 | 69 |
| Acid resistance (*3) | | 3 | 3 | 3 | 3 | 3 | 2 | 3 | 2 | 1 | 3 | 1 | 1 | 1 | 1 |
| Contact angle (°) to water after acid treatment (*4) | | 25 | 22 | 27 | 27 | 30 | 26 | 30 | 30 | 28 | 23 | 45 | 40 | 39 | 39 |
| Outdoor exposure test (*5) | Contact angle to water (°) at the beginning | 88 | 86 | 88 | 87 | 86 | 86 | 89 | 85 | 85 | 86 | 90 | 87 | 88 | 86 |
| | One month appearance | 5 | 5 | 5 | 5 | 4 | 5 | 4 | 5 | 5 | 4 | 2 | 2 | 2 | 2 |
| | One month contact angle to water (°) | 39 | 36 | 40 | 38 | 52 | 42 | 50 | 43 | 43 | 45 | 82 | 80 | 81 | 80 |
| | 3 months appearance | 5 | 5 | 5 | 5 | 4 | 5 | 4 | 5 | 5 | 4 | 3 | 3 | 3 | 3 |
| | 3 months contact angle to water (°) | 30 | 25 | 30 | 28 | 45 | 37 | 42 | 39 | 38 | 40 | 63 | 55 | 58 | 56 |

What is claimed is:

1. A resin composition for use in a coating composition comprising (A) a base resin having a hydroxyl value of 20 to 200, (B) a silicone compound consisting of a partial hydrolysis.condensation product of (i) an organofunctional group-containing alkoxysilane compound containing at least one organofunctional group selected from the group consisting of mercapto group, epoxy group, (meth)acryloyl group, vinyl group, haloalkyl group and amino group, and (ii) a tetraalkoxysilane compound, and (C) a reaction product prepared by partly reacting the hydroxyl group in the base resin (A) with alkoxysilyl group in the silicone compound (B).

2. A resin composition as claimed in claim 1, wherein the base resin (A) is an acrylic copolymer having a weight average molecular weight in the range of 1,000 to 100,000.

3. A resin composition as claimed in claim 1, wherein the base resin (A) is a fluorine-containing copolymer having a weight average molecular weight in the range of 1,000 to 100,000 and a fluorine atom content in the range of 1 to 60% by weight.

4. A resin composition as claimed in claim 1, wherein the silicone compound (B) consists of a partial hydrolysis.condensation product of the organofunctional group-containing alkoxysilane compound (i), the tetraalkoxysilane compound (ii) and (iii) a trialkoxysilane compound.

5. A resin composition as claimed in claim 1, wherein the silicone compound (B) has an average degree of polymerization of 3 to 100.

6. A resin composition as claimed in claim 1, wherein a mixing molar ratio of the compounds (i) and (ii) to be subjected to a partial hydrolysis.condensation reaction is in the range of 8:1 to 1:19.

7. A resin composition as claimed in claim 4, wherein a mixing ratio of the compounds (i), (ii) and (iii) is such that the compound (i) is in the range of 5 to 80 mol %, the compound (ii) is in the range of 10 to 94.9 mol %, and the compound (iii) is in the range of 0.1 to 30 mol %.

8. A resin composition as claimed in claim 4, wherein the compounds (i), (ii) and (iii) are subjected to the partial hydrolysis-condensation reaction to such an extent that the silicone compound (B) has an average degree of polymerization in the range of 3 to 100.

9. A resin composition as claimed in claim 1, wherein said resin composition contains the base resin (A), the silicone compound (B) and the reaction product (C) in such amounts that a mixture of 100 parts by weight, as solid content, of the base resin (A) with 0.1 to 50 parts by weight of the silicone compound (B) is heated and partly reacted at a temperature in the range of 50 to 150° C. so as to partly contain the reaction product (C) in the resin composition.

10. A resin composition as claimed in claim 9, wherein the reaction is partly carried out to such an extent that one to 50% by weight of the solid content of the silicone compound (B) is consumed for the preparation of the reaction product (C).

* * * * *